US007076074B2

(12) United States Patent
Gebert et al.

(10) Patent No.: US 7,076,074 B2
(45) Date of Patent: Jul. 11, 2006

(54) BEARING OF AN ELECTROACOUSTIC MINIATURE TRANSDUCER IN A DEVICE, PARTICULARLY A HEARING AID DEVICE, AS WELL AS AN ELECTROACOUSTIC MINIATURE TRANSDUCER

(75) Inventors: Anton Gebert, Kleinsendelbach (DE); Markus Heerlein, Kitzingen (DE)

(73) Assignee: Siemens Aktiengesellschaft, Munich (DE)

( * ) Notice: Subject to any disclaimer, the term of this patent is extended or adjusted under 35 U.S.C. 154(b) by 182 days.

(21) Appl. No.: 10/402,572

(22) Filed: Mar. 28, 2003

(65) Prior Publication Data

US 2003/0185412 A1 Oct. 2, 2003

(30) Foreign Application Priority Data

Mar. 28, 2002 (DE) ................................ 102 14 187

(51) Int. Cl.
*H04R 25/00* (2006.01)

(52) U.S. Cl. ....................... 381/322; 381/324; 381/328

(58) Field of Classification Search ................ 381/322, 381/324, 325, 327, 328, 330, 338, 370, 380, 381/381, 382, 368; 181/129, 130, 135
See application file for complete search history.

(56) References Cited

U.S. PATENT DOCUMENTS

| | | | | |
|---|---|---|---|---|
| 5,887,070 A * | 3/1999 | Iseberg et al. | .............. | 381/380 |
| 6,751,326 B1 * | 6/2004 | Nepomuceno | .............. | 381/322 |

FOREIGN PATENT DOCUMENTS

| | | |
|---|---|---|
| DE | 36 14 739 | 11/1987 |
| DE | 100 43 201 | 1/2002 |

* cited by examiner

*Primary Examiner*—Huyen Le
(74) *Attorney, Agent, or Firm*—Schiff Hardin LLP

(57) ABSTRACT

A space-saving, simply assembled bearing of an electroacoustic miniature transducer that also exhibits good damping properties is provided via a first and second elastic retainer element, whereby the first elastic retainer element is secured to the housing of the electroacoustic miniature transducer only in a central region of the front side of the housing and the second elastic retainer element is secured to the housing of the electroacoustic miniature transducer only in a central region of the housing backside lying opposite the front side of the housing.

15 Claims, 1 Drawing Sheet

BEARING OF AN ELECTROACOUSTIC MINIATURE TRANSDUCER IN A DEVICE, PARTICULARLY A HEARING AID DEVICE, AS WELL AS AN ELECTROACOUSTIC MINIATURE TRANSDUCER

BACKGROUND OF THE INVENTION

1. Field of the Invention

The invention is directed to the bearing of an electroacoustic miniature transducer having a housing and a sound passage opening arranged in the front side of the housing in a device, particularly in a hearing aid device. The invention is also directed to an electroacoustic miniature transducer.

2. Description of the Related Art

Electroacoustic miniature transducers are employed for converting electrical signals into acoustic signals as well as for converting acoustic signals into electrical signals. In numerous areas of employment such as, for example, in telephones or hearing aid devices, an acoustic signal is picked up by an acousto-electrical miniature transducer (microphone) and further-processed, and an acoustic signal is output by an electro-acoustic miniature transducer (earphone). In order to avoid feedback, the sound output by the earphone must be prevented from being picked up by the microphone. The degree of damping between earphone and microphone, namely, determines the maximally possible gain of the device. When, for example, in a hearing aid device, the acoustic pressure of the earphone proceeds into the microphone damped by 60 dB, feedback whistling will occur given a gain of around 60 dB.

In electroacoustic devices, a second, parasitic path of signal transmission exists in addition to the direct sound transmission from the earphone to the microphone. In addition to outputting sound directly via the air, the earphone can also output sound by vibrations of the earphone housing. Conversely, the microphone also picks up structure-borne sound via its housing. In the example of the hearing aid device, this parasitic path of sound transmission also reduces the damping between earphone and microphone and thus limits the maximally obtainable gain.

For increasing the damping, attempts are made to spatially separate the earphone and microphone as far as possible from one another. However, in, for example, hearing aid devices, this is only possible to a limited extent due to the desired miniaturization of the devices. For limiting the direct sound transmission through the air from the earphone to the microphone of a hearing aid device, the sound is conducted from the earphone into the auditory canal of the hearing aid user via a sound channel in which the auditory canal is sealed off from the outside by the hearing aid housing or an otoplastic.

German patent document DE 100 43 201 C1 discloses an electroacoustic miniature transducer having a housing and a sound passage opening that can also be employed in a hearing aid device. As second housing that surrounds the sound passage opening is present in addition to the housing of the miniature transducer. The miniature transducer is thereby fixed via a cylindrical connection piece in communication with a rubber house in the second housing.

German patent document DE 36 14 739 A1 discloses an elastic bearing for an earphone to be attached in a hearing aid in which an elastic bush is plugged onto a sound exit connection piece of the earphone and is buttoned into an opening of the hearing aid housing.

SUMMARY OF THE INVENTION

An object of the present invention is to provide a simply realized bearing of an electroacoustic miniature transducer in which the pick-up or output of sound via the housing of the electroacoustic miniature transducer is reduced. Another object of the invention is to provide an electroacoustic miniature transducer that is suited for this bearing.

Given a bearing of an electroacoustic miniature transducer having a housing and a sound passage opening arranged in the front side of the housing in a device, particularly in a hearing aid device, this object is inventively achieved in that a first as well as a second elastic retainer element are present, where the first elastic retainer element is secured to the housing of the electroacoustic miniature transducer only in a central region of the front side of the housing and the second elastic retainer element is secured to the housing of the electroacoustic miniature transducer only in a central region of the housing backside lying opposite the front side of the housing, and where the elastic retainer elements are supported along their outer edge either directly in a receptacle present in the device or are supported at a sleeve surrounding the electroacoustic miniature transducer, and this sleeve is connected to a receptacle present in the device.

In an electroacoustic miniature transducer having a housing fashioned for a bearing in a device, particularly a hearing aid device, the object is also achieved by a first as well as a second elastic retainer element are present, where the first elastic retainer element is secured to the housing of the electroacoustic miniature transducer only in a central region of the front side of the housing and the second elastic retainer element is secured to the housing of the electroacoustic miniature transducer only in a central region of the housing backside lying opposite the front side of the housing, where the electroacoustic miniature transducer is surrounded by a sleeve, and where the elastic retainer elements are supported at their outer edge at the sleeve.

In the bearing according to the invention, vibration-damping, elastic retainer elements are arranged at the front housing side as well as at the back housing side of the electroacoustic miniature transducer. These are secured to the electroacoustic miniature transducer only in a central region of the appertaining housing side. This can utilize a releasable connection, for example, a plug-type connection with the needed mechanism for this, as well as a non-releasable connection, for example, a glued connection. The elastic retainer element is preferably of such a nature that it at least partly projects beyond the housing in its condition of being connected to the housing of the electroacoustic miniature transducer. In the assembly of the appertaining device, thus, the electroacoustic miniature transducer can simply be inserted into the cavity in the device provided for this, particularly, too, when a wall forming the cavity embraces the electroacoustic miniature transducer. The elastic retainer elements then apply to the fixing of the electroacoustic miniature transducer in the cavity and simultaneously see to the necessary spacing between the transducer housing and the wall surrounding the cavity.

For bearing the electroacoustic miniature transducer in a device, the elastic retainer elements can also be directly connected to correspondingly shaped receptacles in the device. A cavity that surrounds the earphone housing and is formed by transducer elements is thus not necessary. Both a releasable as well as a fixed connection between the retainer elements and the receptacles is conceivable. There is preferably a releasable interlocking connection, so that the electroacoustic miniature transducer can be inserted into the housing in a simple way and can be in turn removed from it just as easily.

It is also possible that the electroacoustic miniature transducer is surrounded by a sleeve, and that the elastic retainer elements interact with this sleeve for bearing the electroacoustic miniature transducer. The electroacoustic miniature transducer can then be inserted into the respective sleeve together with the sleeve as one structural unit.

The invention offers the advantage that the effective region of the elastic retainer element is significantly enlarged compared to a damping sleeve surrounding the miniature transducer housing that is known from the Prior Art. Particularly given hearing aids, the available space for the electroacoustic miniature transducer is strictly limited because of the desired miniaturization. This sleeve known from the Prior Art can therefore only be implemented relatively thin. What the fastening of the elastic retainer element of the invention in the center of the front or back housing side achieves is that the expanse of the vibration-damping region is significantly enlarged. The effective "thickness" of the vibration-damping, elastic retainer element derives from this, namely from the distance between the fastening point to the transducer housing and the device or the sleeve. The vibration-damping properties of the bearing are significantly improved as a result of this.

DESCRIPTION OF THE DRAWINGS

Further details and advantages of the invention are explained in greater detail below on the basis of the exemplary embodiments shown in the drawings.

DETAILED DESCRIPTION OF THE PREFERRED EMBODIMENTS

Figure 1:
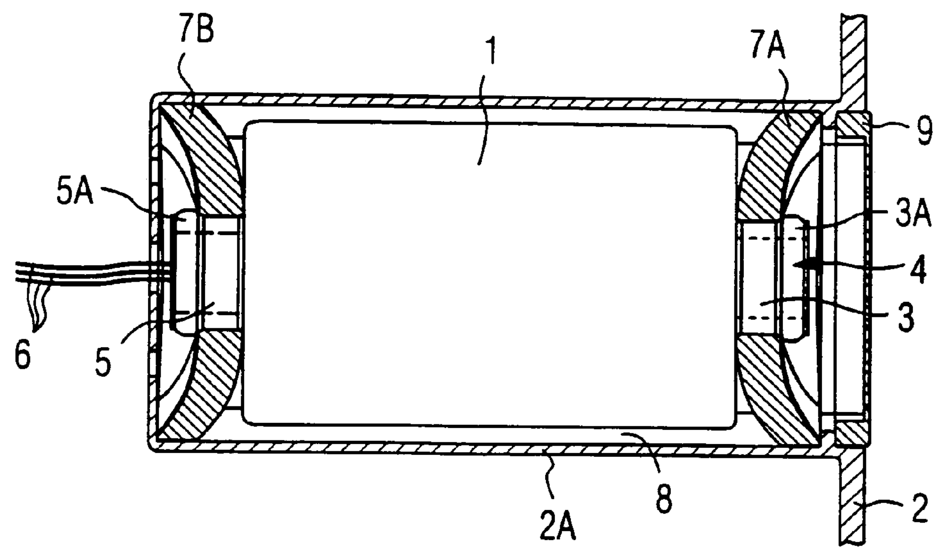
FIG. 1 is a pictorial schematic diagram of an earphone introduced into a hearing aid device.

FIG. 1 shows an electroacoustic miniature transducer that is implemented as earphone 1 and is arranged in a hearing aid device. Only a small portion of the hearing aid device is shown. This is a part 2 of the surface of the hearing aid device housing as well as a wall 2A that forms a preferably tubular cavity inside the hearing aid housing. The earphone 1 is located inside the cavity formed by the wall 2A.

The wall 2A, just like the hearing aid housing 2, is advantageously manufactured in a stereo lithographic process or in a laser sintering process. In these methods particularly known for fabricating ItE housing shells (ItE=in the ear hearing aid), an ear impression is scanned with a high-precision 3D scanner and digitalized. The digital image is then converted into a virtual hearing aid shell. Subsequently, the shell is compounded of a specific granulate in a plurality of layers in a stereo lithographic process or in a laser sintering process. The volume required for the earphone can thus already be taken into consideration in the fabrication of the hearing aid housing 2. The hearing aid housing 2 as well as the fastening mechanism for the earphone 1 in the hearing aid, particularly a wall 2A forming a cavity, are thus integrally joined to one another and can be manufactured in the same manufacturing process.

The earphone 1 comprises a sound passage connector 3 at its front housing side. This connector 3 forms the sound discharge opening 4 of the earphone 1. A connection piece 5 is located at the back housing side lying opposite the front housing side of the earphone 1. In the exemplary embodiment, its external shape agrees with the external shape of the sound passage connector 3. The connection piece 5 is likewise tubularly fashioned and serves for the passage of the electrical leads 6 of the earphone 1.

According to this embodiment, elastic retainer elements 7A or 7B are arranged at the front housing side as well as at the back housing side of the earphone 1. For fastening to the earphone 1, the elastic retainer elements 7A and 7B comprise negatively shaped openings corresponding to the external shape of the sound passage connector 3 or of the connection piece 5 so that they can be plugged onto the connectors in a simple way. Beads 3A or 5A applied to the sound passage connector 3 as well as the connection piece 5 serve for additional fixing. In the exemplary embodiment, the elastic retainer elements 7A and 7B comprise an identical external shape, which simplifies and lowers the cost of their manufacture.

In that the sound passage connector 3 as well as the connection piece 5 are arranged in the center of the front housing side or of the back housing side and the elastic retainer elements 7A or 7B are connected to the earphone 1 only via these, a comparatively large distance is present between the sound passage connector 3 or the connection piece 5 and the wall 2A surrounding the earphone 1 at which the elastic retainer elements 7A and 7B are supported along their outer edge. At the same time, this is the effective distance for vibration damping between the earphone 1 and the wall 2A as a result of the elastic retainer elements 7A and 7B.

The overall bearing arrangement can be implemented such that the gap 8 between the earphone 1 and the wall 2A is fashioned comparatively thin and, for example, lies in the range of a very few tenths of a millimeter dependent on the anticipated vibration amplitudes and manufacturing tolerances. The bearing thus occupies only the minimally required space for the earphone 1.

Furthermore, the assembly of the arrangement is extremely simple. The elastic retainer elements 7A or 7B may be slipped onto the sound passage connector 3 or the connection piece 5 and are introduced together with the earphone 1 into the cavity of the hearing aid formed by the wall 2A. The cavity preferably comprises a circular or rectangular cross-section, preferably corresponding to the external shape of the earphone 1. A volume surrounding the earphone. 1 may thus be closed airtight by elastic retainer elements 7A and 7B fashioned according to this cross-section. This lateral, airtight closure also contributes to avoiding feedback.

The elastic retainer element 7A may be fashioned disk-shaped to slightly funnel-shaped in the exemplary embodiment. The acoustic properties of the earphone 1 can also be influenced by this fashioning. A strengthening of this funnel-shaped fashioning leads to an improved sound transmission in the high pitch range.

Further advantages in addition to the good vibration damping and the simple assembly derive in conjunction with the invention. Thus, for example, the earphone hose usually needed given earphones seated in a hearing aid can be eliminated. This is a hose that is slipped onto the sound passage connector and discharges in a small opening in the hearing aid housing. Instead of this, the sound passage connector 3 in the exemplary embodiment is situated very close to the surface of the hearing aid housing so that a sound conduit in the form of a sound hose is not required.

Over and above this, the entire cross-sectional area of the volume occupied by the earphone may be available for the acceptance of cerumen. The cerumen protection may thus also significantly be improved by the invention.

A protective covering 9 that, for example, can be implemented as a simple protective lattice is advantageously provided in the exemplary embodiment. The space between the protective lattice and the elastic retainer element 7A is then available for collecting cerumen. In that this space has been significantly enlarged compared to traditional solutions, significantly more cerumen can be collected and outage caused by blockage occur significantly less often. Preferably, the protective covering 9 is releasably connected to the hearing aid housing 2 so that this may be removed for cleaning purposes or for replacing the earphone 1.

Figure 2:
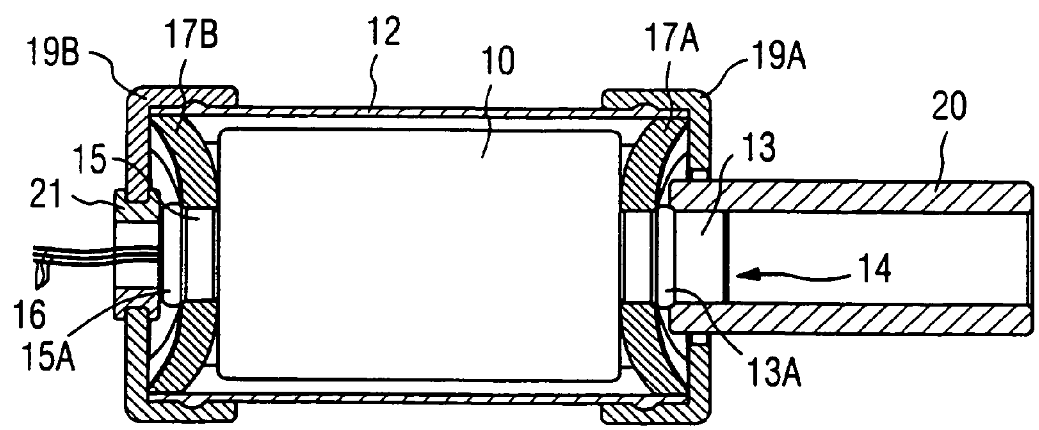
FIG. 2 is a pictorial schematic diagram of a structural unit having an earphone and a sleeve surrounding the earphone.

FIG. 2 shows a further embodiment of the invention. As in the exemplary embodiment according to FIG. 1, FIG. 2 also shows an earphone 10 that comprises a sound passage connector 10 at its front housing side and a connection piece 15 at its back housing side. A respective elastic retainer element 17A or 17B is also plugged onto these and fixed by use of beads 13A or 15A. Differing from the exemplary embodiment according to FIG. 1, however, the earphone 10 is surrounded by a preferably tubular sleeve 12 at which the elastic retainer elements 17A or 17B are supported. At its front side, the arrangement also comprises a front cover 19A and comprises a back cover 19B at its back side. These covers, however, are optional and can thus also be omitted. An opening for the passage of a sound hose 20 is formed in the front cover 19A, and the back cover 19B is fashioned for the passage of the electrical leads 16 of the earphone 1. For this purpose, a hole in the middle of the back cover is provided with an elastic sleeve 21.

The overall arrangement is preferably symmetrical relative to an axis proceeding through the sound passage connector 13 and the connection piece 15 and has a circular or rectangular cross-section. The two elastic retainer elements 19A and 19B close the volume enclosed between the retainer elements and the sleeve 12 off airtight, so that feedback is largely avoided. The gap size between the earphone 10 and the sleeve 12 can be selected comparatively small dependent on the anticipated, maximum vibration amplitude and fabrication tolerances. The overall arrangement therefore occupies only a small space for accommodation in a device, particularly a hearing aid device.

Advantageously, the entire unit of the exemplary embodiment according to FIG. 2—as a prefabricated structural unit—can be introduced in toto into or removed in toto from a device having correspondingly fashioned receptacles. This considerably simplifies, for example, the assembly of a hearing aid device or a replacement of the earphone in case of repair.

The exemplary embodiments show only a small selection from a plurality of conceivable solutions of the invention. The exemplary embodiments can likewise also be easily transferred to electroacoustic miniature transducers fashioned as microphone. The invention is preferably employed in hearing aid devices such as hearing aids to be worn in the ear (ItE) or hearing aids to be worn behind the ear (BtE). However, there are numerous other use possibilities, for example, telephones.

The following can be stated in summary:

The preferred embodiments of the invention illustrate the intention to create a space-saving, simply assembled bearing of an electroacoustic miniature transducer (1, 10) that also exhibits good damping properties. To this end, a first as well as a second elastic retainer element (7A, 7B, 17A, 17B) are provided, by which the first elastic retainer element (7A, 17A) is secured to the housing of the electroacoustic miniature transducer (1, 10) only in a central region of the front side of the housing and the second elastic retainer element (7B, 17B) is secured to the housing of the electroacoustic miniature transducer (1, 10) only in a central region of the housing backside lying opposite the front side of the housing.

Preferably, the first elastic retainer element (7A, 17A) projects at least partially beyond the outer edge of the front housing side and the second elastic retainer element (7, 17B) projects at least partially beyond the outer edge of the back housing side. The attachment of the elastic retainer elements (7A, 7B, 17A, 17B) to the front housing side or to the back housing side enables a simple assembly, for example, by simply inserting the electroacoustic miniature transducer (1, 10) with the elastic retainer elements (7A, 17A, 7B, 17B) into a correspondingly shaped housing opening. As a result, because the elastic retainer elements (7A, 17A, 7B, 17B) are respectively secured only in the center of the front housing side or back housing side, a comparatively long vibration-damping region of the elastic retainer elements (7A, 7B,. 17A, 17B) derives.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware components configured to perform the specified functions. Furthermore, the present invention could employ any number of conventional techniques for its configuration.

The particular implementations shown and described herein are illustrative examples of the invention and are not intended to otherwise limit the scope of the invention in any way. For the sake of brevity, conventional aspects may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

LIST OF REFERENCE CHARACTERS

1, 10 microphone/earphone
2 hearing aid housing
2A wall
3, 13 sound passage connector
4, 14 sound admission opening
5, 15 connection piece
7A, 7B,17A, 17B elastic retainer elements
3A, 5A, 13A, 15A beads
8, 18 gap
9 protective cover
12 sleeve
19A front cover

19B back cover
20 sound hose
21 elastic sleeve

What is claimed is:

1. A bearing of a miniature electroacoustic transducer having a housing and a sound passage opening arranged in a front side of the housing in a device, the bearing comprising:

a first and a second elastic retainer element, the first elastic retainer element being secured to the housing of the electroacoustic miniature transducer only in a central region of the front side of the housing, the second elastic retainer element being secured to the housing of the electroacoustic miniature transducer only in a central region of the housing backside lying opposite the front side of the housing, and the elastic retainer elements being supported along their outer edge either directly in a receptacle present in the device or are supported at a sleeve surrounding the electroacoustic miniature transducer, and this sleeve is connected to a receptacle present in the device.

2. The bearing according to claim 1, wherein:

at least one of a) the first elastic retainer element projecting at least partially beyond the outer edge of the front housing side and b) the second elastic retainer element projecting at least partially beyond the outer edge of the back housing side is present.

3. The bearing according to claim 1, wherein:

the front housing side comprises a sound passage connector, and the first elastic retainer element is secured to the housing of the electroacoustic miniature transducer by the sound passage connector.

4. The bearing according to one claim 1, wherein:

the back housing side comprises a connection piece, and the second elastic retainer element is secured to the housing of the electroacoustic miniature transducer by the connection piece.

5. The bearing according to claim 3, wherein the sound passage connector comprises a bead for fixing the elastic retainer element connected to it.

6. The bearing according to claim 4, wherein the connection piece comprises a bead for fixing the elastic retainer element connected to it.

7. The bearing according to claim 4, wherein the connection piece is tubularly fashioned to permit a passage of electrical lines.

8. The bearing according to claim 1, wherein at least one of the first and the second elastic retainer element is fashioned disk-shaped.

9. The bearing according to claim 1, wherein at least one of the first and the second elastic retainer element is fashioned funnel-shaped.

10. The bearing according to claim 1, wherein:

at least one of the first elastic retainer element, the second elastic retainer element and the electroacoustic transducer is arranged in at least one tubular cavity of the device, and at least one of the first elastic retainer element and the second elastic retainer element is connected to at least one wall surrounding the at least one tubular cavity.

11. The bearing according to claim 1, wherein:

at least one of the first elastic retainer element, the second elastic retainer element, and the electroacoustic transducer is surrounded by at least one tubular sleeve, and at least one of the first elastic retainer element and the second elastic retainer element is connected to the sleeve.

12. The bearing according to claim 10, wherein:

the first elastic retainer element and the second elastic retainer element close a volume between the electroacoustic transducer and the at least one wall surrounding the at least one tubular cavity off substantially airtight.

13. The bearing according to claim 11, wherein:

the first elastic retainer element and the second elastic retainer element close the volume between the electroacoustic transducer and the wall surrounding the cavity or, respectively, the sleeve off substantially airtight.

14. The bearing according to claim 1, wherein the device is a hearing aid device.

15. An electroacoustic miniature transducer, comprising:

a housing, fashioned for bearing in a hearing aid device;

a first elastic retainer element that is secured to the housing of the electroacoustic miniature transducer only in a central region of a front side of the housing;

a second elastic retainer element that is secured to the housing of the electroacoustic miniature transducer only in a central region of a housing backside lying opposite the front side of the housing; and a sleeve that surrounds the electroacoustic miniature transducer, the first and the second elastic retainer elements configured to be supported at the sleeve along their outer edge.

* * * * *